United States Patent
Bertsche et al.

(10) Patent No.: US 6,358,185 B1
(45) Date of Patent: Mar. 19, 2002

(54) SHIFTING DEVICE IN A VARIABLE SPEED GEARBOX WITH PRESSURE REGULATING VALVES FOR WORKING AND FEED PRESSURE

(75) Inventors: Bernd Bertsche, Tuttlingen; Günter Indlekofer, Mühlacker; Ludger Kortenjann, Fellbach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/486,113

(22) PCT Filed: Aug. 5, 1998

(86) PCT No.: PCT/EP98/04870

§ 371 Date: May 2, 2000

§ 102(e) Date: May 2, 2000

(87) PCT Pub. No.: WO99/09338

PCT Pub. Date: Feb. 25, 1999

(30) Foreign Application Priority Data

Aug. 18, 1997 (DE) .......................... 197 35 820

(51) Int. Cl.[7] .............................................. F16H 61/26
(52) U.S. Cl. ....................................... 477/163; 477/158
(58) Field of Search ............................ 477/127, 130, 477/131, 138, 156, 158, 163

(56) References Cited

U.S. PATENT DOCUMENTS

| | | | | |
|---|---|---|---|---|
| 3,641,845 A | * | 2/1972 | Uozumi ..................... | 477/158 |
| 3,703,110 A | * | 11/1972 | Uozumi et al. .......... | 477/158 X |
| 3,885,476 A | * | 5/1975 | Leorat et al. ............... | 477/158 |
| 4,094,211 A | * | 6/1978 | Espenshied ................. | 477/163 |
| 4,345,489 A | * | 8/1982 | Muller et al. ........... | 477/163 X |
| 4,488,456 A | * | 12/1984 | Taga et al. .............. | 477/163 X |
| 4,611,285 A | * | 9/1986 | Weisman, II ........... | 477/138 X |
| 4,633,737 A | * | 1/1987 | Nishikawa et al. ..... | 477/131 X |
| 4,660,442 A | * | 4/1987 | Nishikawa et al. ..... | 477/114 X |
| 4,893,527 A | * | 1/1990 | Furusawa et al. ....... | 477/131 X |
| 5,079,973 A | * | 1/1992 | Ookubo et al. ......... | 477/158 X |
| 5,906,556 A | * | 5/1999 | Harada et al. .......... | 477/175 X |
| 5,921,888 A | * | 7/1999 | Park .......................... | 477/131 |
| 6,077,192 A | * | 6/2000 | Tamai et al. ............ | 477/156 X |
| 6,190,285 B1 | * | 2/2001 | Minowa et al. ............ | 477/156 |

FOREIGN PATENT DOCUMENTS

| | | | |
|---|---|---|---|
| DE | 38 12 003 | 11/1988 | |
| DE | 40 36 076 | 5/1991 | |
| DE | 43 20 858 | 1/1994 | |
| EP | 0 571 275 | 11/1993 | |
| JP | 402304245 | * 12/1990 | ............ 477/156 |

* cited by examiner

Primary Examiner—Charles A Marmor
Assistant Examiner—Roger Pang
(74) Attorney, Agent, or Firm—Crowell & Moring LLP

(57) ABSTRACT

A gearbox of a gear-changing appliance has a frictional connection whose engagement by a hydraulic fluid actuator causes an associated gearbox transmission ratio to be effective. A control pressure derived from the working pressure of the actuator is used to influence a pressure regulating valve for a supply pressure present at a pressure regulating valve which adjusts the working pressure as required by an electronic control unit.

4 Claims, 3 Drawing Sheets

SHIFTING DEVICE IN A VARIABLE SPEED GEARBOX WITH PRESSURE REGULATING VALVES FOR WORKING AND FEED PRESSURE

This application claims priority of PCT/EP98/04870, filed Aug. 18, 1997, the disclosure of which is expressly incorporated by reference herein.

The present invention relates to a gear-changing appliance of a gearbox. In a known gear-changing appliance of the type described in DE 4124385 C1, the pressure regulating valve for the supply pressure operates as a function of a load-dependent it modulating pressure, for whose generation an independent regulating system is necessary. This system increases the costs of the electrohydraulic control and takes up valuable installation space within the conventionally employed control plate in the gearbox casing.

In the known arrangement of DE 42 41 593 A1 for automatically shifting an epicyclic gear-changing gearbox of a motor vehicle from a previous old gear, in which a first frictional connection (clutch or brake) is engaged by an associated hydraulic fluid gear-change actuator, into a new gear. A second frictional connection is engaged by an associated hydraulic fluid gear-change actuator, and the first frictional connection is disengaged by switching off the working pressure from the associated gear-change actuator. The working pressure of the gear-change actuator of the new gear is measured, and the working pressure of the gear-change actuator of the old gear is switched off if the working pressure of the gear-change actuator of the new gear reaches or exceeds a significant pressure value determined by a comparison with a reference parameter. In order to be able to switch off the gear-change actuator of the previous gear during a gear change, also taking account of gear-changing comfort and service life of the gear-changing means involved, the gear-changing comfort is possibly impaired by the gear-changing jolt which may occur and the service life is possibly impaired by excessively long slip times of the friction surfaces. Therefore provision is made in this known arrangement for the reference parameter to be variable as a function of the load torque on the driving engine, taking account, if necessary, of the converter relationship of a hydrodynamic torque converter and the significant pressure value is associated with that instantaneous value of the transmittable torque of the frictional connection of the new gear which corresponds to the instantaneous actual value of the load torque. In this known arrangement, the working pressure of the gear-changing actuators is adjusted by electromagnetic pressure regulating valves which can be activated by an electronic control unit, a load-dependent supply pressure being supplied to the pressure regulating valves. No statement is made in the publication with regard to the formation or generation of this supply pressure.

Finally, another type of device described is also described in DE 36 30 792 A1. In order to generate a main pressure dependent on the operating state of the motor vehicle for activating actuators of an automatic motor-vehicle gearbox, this device is provided with an adjustable delivery pump which adjusts the main pressure by changing the delivery quantity. A control valve is used to supply a pump adjustment pressure acting on a quantity adjustment device of the delivery pump in such a way as to adjust the delivery quantity. In order to ensure, using the simplest possible means, that the main pressure is optimally adjusted to correspond to the operating state of the motor vehicle in each case, a configuration is selected such that the control valve has a regulating piston which generates the pump adjustment pressure, and which is subjected on one balance surface to the fed-back pump adjustment pressure and on an oppositely-directed balance surface to a pressure which varies as a function of the operating state and the control piston acted on by the main pressure.

The present invention may be essentially considered as being based on the object of keeping the outlay on producing the load dependence of the supply pressure small in a gear-changing appliance. The object explained is advantageously achieved, in accordance with the invention, by deriving a control pressure from the working pressure to constitute a load-dependent control signal.

The switching appliance according to the invention is distinguished by the fact that only one frictional connection is engaged and is subjected to working pressure in each gear. The working pressures are directly regulated by electromagnetic pilot valves and associated pressure regulating valves. The working pressures can be freely regulated, as they are not interdependent.

The gear-changing appliance according to the invention is further distinguished by the fact that the six frictional connections or their actuators, necessary for example in the case of a six-speed gearbox, are-supplied with working pressure through the action of a total of only three pilot valves and their associated pressure regulating valves. The allocation of the regulated working pressures to the actuators can take place by a manual selection slide valve and two switching valves which are activated by a positional control valve. In the gear-changing appliance according to the invention, the actuators are exclusively subjected to pressure from the pressure regulating valves for the working pressure. There is no changeover to the supply pressure. The gear-changing appliance according to the invention is, furthermore, distinguished by the fact that only the working pressure of the frictional connection carrying power or of the associated actuator determines the respective necessary supply pressure.

In the gear-changing appliance according to the invention, the basic value of the supply pressure is fixed by a valve spring of the relevant pressure regulating valve when the gearbox is not in a power-transmitting condition.

An advantageous embodiment of the priority controller in the gear-changing appliance according to the invention is described herein.

A measure is directed toward a safety function of the gear changing appliance according to the invention, and this function avoids the pressure regulating valve for the supply pressure adjusting to an excessive pressure if a pressure regulating valve for the working pressure jams in transit position.

DETAILED DESCRIPTION OF THE DRAWINGS

Figure 1:
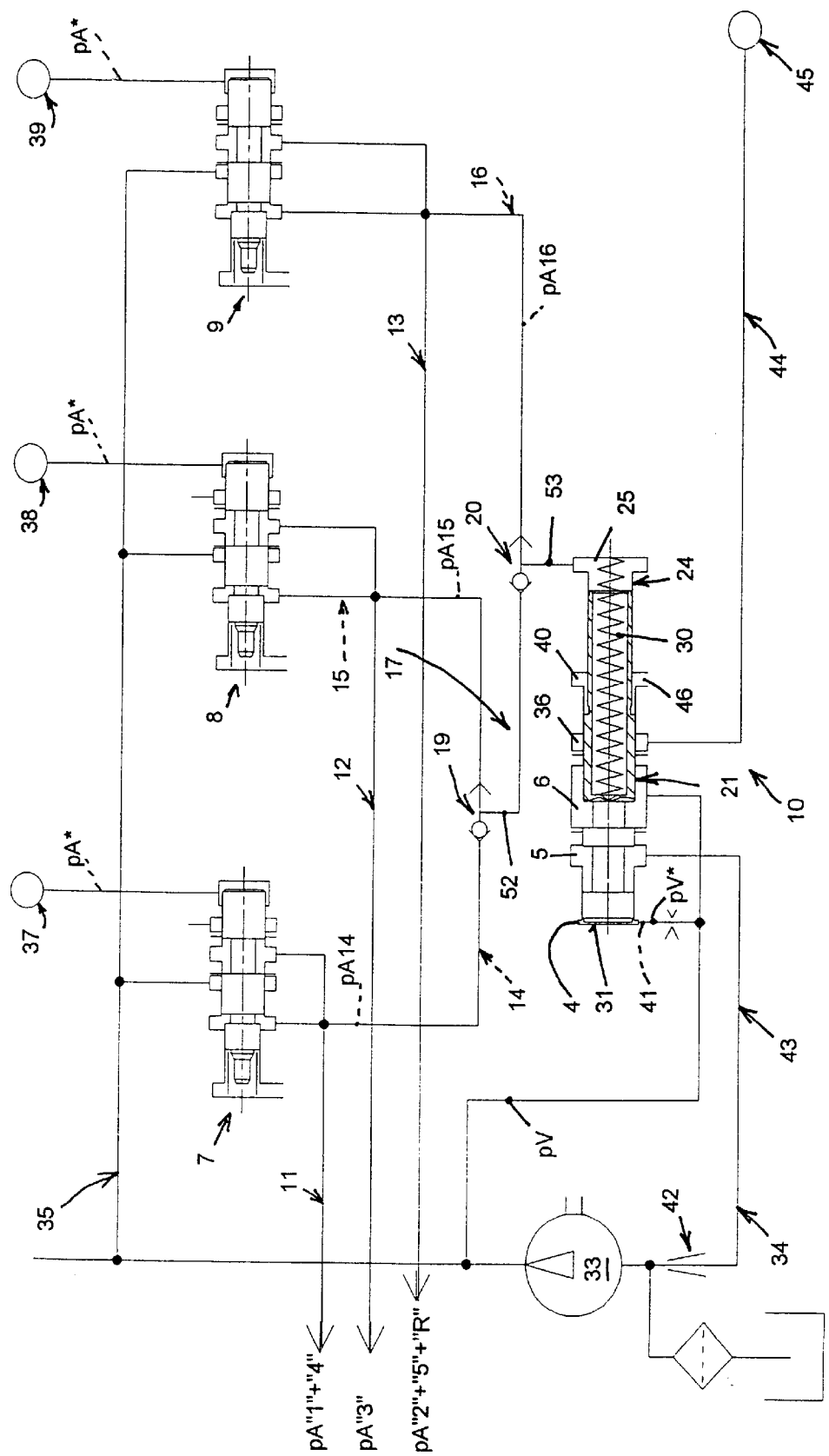
FIG. 1 is a schematic diagram of a first embodiment of a gear-changing appliance according to the invention in a first configuration, with hydraulic linkage of the valves employed.

Referring first to FIG. 1, the supply pressure pV of the gear-changing appliance is generated by a pressure pump 33 continuously driven by a driving motor. The pressure pump 33 draws in hydraulic fluid from a reservoir 34 and delivers it into a pressure line 35 which is connected to pressure regulating valves 7 to 9 for a respective working pressure pA and to a pressure regulating valve 10 for the supply pressure pV.

The pressure regulating valve 7 regulates the working pressure pA of a working pressure line 11, which is associated via gear-changing control valves and a manual selector valve with the gear-changing actuators for actuating the frictional connections associated with the forward gears "1" and "4", as a function of a load-dependent control pressure pA* of an electromagnetic pilot valve 37 which can be activated by an electronic control unit. The pressure regulating valve 8 regulates the working pressure pA of a working pressure line 12, which is associated via the gear-changing control valves and the manual selector valve with the gear-changing actuator for actuating the frictional connection associated with a forward gear "3", as a function of a load-dependent control pressure pA* of an electromagnetic pilot valve 38 which can be activated by the electronic control unit. The pressure regulating valve 9 regulates the working pressure pA of a working pressure line 13, which is associated via the gear-changing control valves and the manual selector valve with the gear-changing actuators for actuating the frictional connections associated with the forward gears "2" and "5" and a reverse gear "R", as a function of a load-dependent control pressure pA* of an electromagnetic pilot valve 39 which can be activated by the electronic control unit.

The pressure regulating valves 7 to 9 are, in addition, respectively connected to a control pressure line 14 or 15 or 16, which respectively branch off from their working pressure line 11 or 12 or 13 and which are connected via a priority control arrangement 17 (18 in FIG. 2) to the pressure regulating valve 10 (10a in FIG. 2) for the supply pressure pV.

The pressure regulating valve 10 (10a in FIG. 2) has a regulating piston 21 which subdivides a valve chamber 24 (24a in FIG. 2) into two control pressure chambers 4 and 25 (26 in FIG. 2) located at its ends, into a further control pressure chamber 40 and into three valve chambers 5, 6 and 36 located one behind the other. The control pressure chamber 4 is connected to a control pressure line 41 which branches off from the pressure line 35 via a throttle, so that the regulating piston 21 can be subjected on its relevant end, with the effective pressure surface 31, to a control pressure pV* which depends on the supply pressure pV. A valve spring 30 acts in the opposite direction on the regulating piston 21. A control pressure, which (because of the function of the priority control arrangement 17 (18 in FIG. 2)) is derived from the working pressure line 11 or 12 or 13 carrying the instantaneously highest working pressure pA, acts on the regulating piston 21 in the same direction as the valve spring 30. The valve chamber 5 is connected to a return line 43 which is connected, via an injector 42, to the suction side of the pump 33. The valve chamber 6 is connected to the pressure line 35 for the supply pressure pV. The valve chamber 36 is connected to a supply line 44 leading to a lubrication system 45. The control pressure chamber 40 is connected to the atmosphere through a null connection 46.

Figure 3:
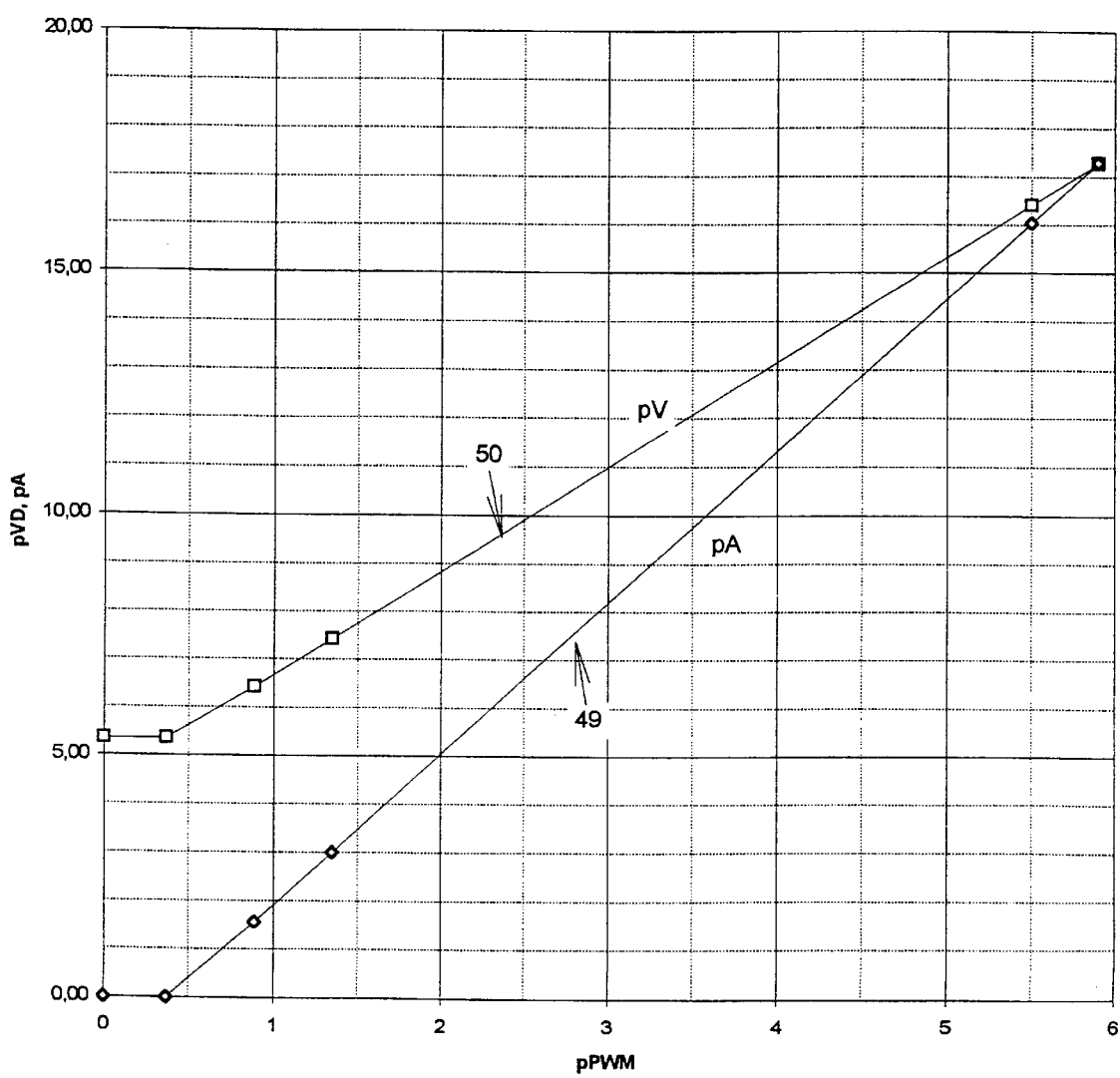
FIG. 3 is a diagram representing the valve characteristic of the pressure regulating valve for the supply pressure of the gearchanging appliance according to the invention.

The end surface 31, which is located in the control pressure chamber 4, of the regulating piston 21 has a diameter which is greater than the diameter 48 of the end surface which is located in the control pressure chamber 25 (26), of the regulating piston 21. Because of this difference in surface area, the pressure regulating valve 10 (10a) has the valve characteristic represented in FIG. 3, which is distinguished by the fact that the variation 49 of the control pressure force pA•F32 associated with the end surface 32 is steeper, as a function of the valve displacement "s" than the variation 50 of the control pressure force pV*F31 associated with the end surface 31. In this way, the supply pressure pV is limited to a value corresponding to the maximum value 51 if one of the pressure regulating valves 7 to 9 should jam in the transit position, thus making an overpressure valve unnecessary.

Figure 2:
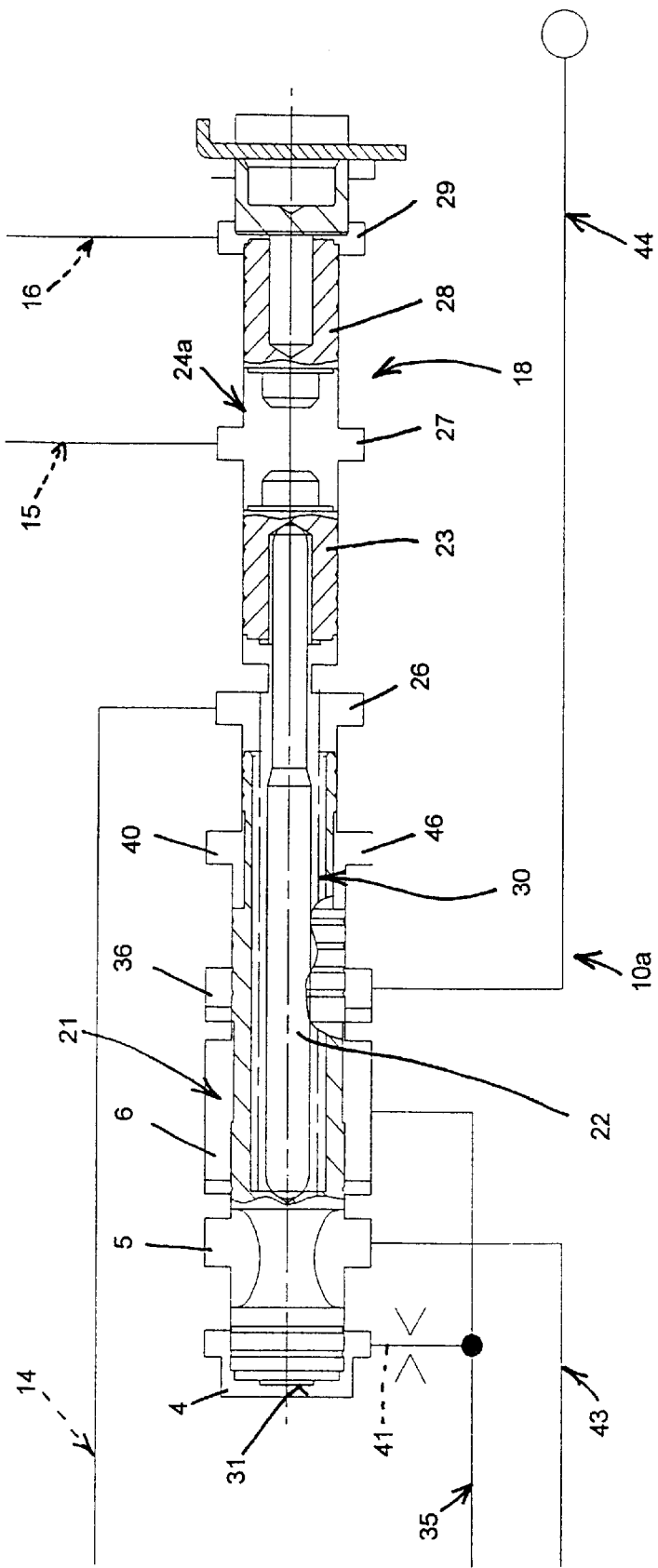
FIG. 2 is a schematic diagram of a second embodiment of a gear-changing appliance according to the invention, with hydraulic linkage of the valves employed.
Figure 1A:
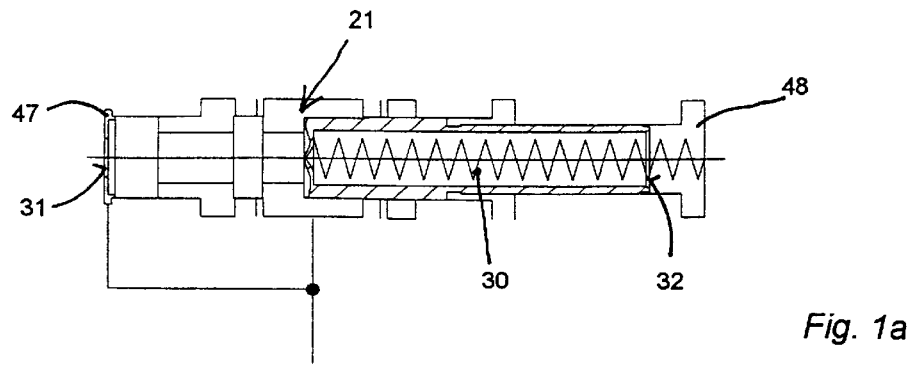
FIG. 1a is an isolated, partial cross-sectional view of a pressure regulating valve of the gear-changing appliance of FIG. 1.

In the arrangement and configuration described up to now, the two gear-changing appliances of FIGS. 1 and 2 coincide.

The two embodiments differ in the type of their priority control arrangement 17 (18).

In the priority control arrangement 17 of FIG. 1, the control pressure lines 14, 15 of the respective pressure regulating valves 7, 8 are connected to a control pressure intermediate line 52 by a 3/2-way alternate shut-off valve 19 in such a way that this intermediate line 52 always communicates with the control pressure line 14 or 15 carrying the higher pressure. The control pressure intermediate line 52 and the control pressure line 16 of the pressure regulating valve 9 are connected by a 3/2-way alternate shut-off valve 20 to a control pressure output line 53 leading to the control pressure chamber 25 in such a way that the control pressure chamber 25 always communicates with the line 16 or 52 carrying the higher pressure, i.e. to the control pressure line 14 or 15 or 16 carrying the highest pressure.

The operation of the above system can be described using the following example of a gear change from the "$2^{nd}$" gear to the "$3^{rd}$" gear.

In the "$2^{nd}$" gear, the pilot valve 39 with the connected pressure regulating valve 9 regulates the working pressure pA of the actuator of the associated frictional connection. The control pressure pA16 derived from the working pressure pA is fed via the alternate shut-off valve 20 to the pressure regulating valve 10 and there determines the level of the supply pressure pV. During the gear change, the working pressure pA in the working pressure line 12 leading to the actuator of the "$3^{rd}$" gear is increased by the pilot valve 38 and the connected pressure regulating valve 8, and the working pressure pA in the working pressure line 13 of the "$2^{nd}$" gear is reduced by the pilot valve 39. When there is a pressure balance in the working pressure lines 12, 13, the alternate shutoff valve 20 switches over so that the working pressure pA of the working pressure line 12, together with the valve spring 30, now acts on the regulating piston 21 of the pressure regulating valve 10 so as to determine the regulation.

In the priority control arrangement 18 of FIG. 2, the control pressure line 14 of the pressure regulating valve 7 is connected to the control pressure chamber 26 of the pressure regulating valve 10a and the control pressure lines 15, 16 of the respective pressure regulating valves 8, 9 are respectively connected to further control pressure chambers 27, 29 of the pressure regulating valve 10a. The control pressure chambers 26, 27 of the pressure regulating valve 10a are separated from one another by a priority control piston 23, which is arranged so that it can be axially displaced in the valve chamber 24a and can be rigidly supported relative to the regulating piston 21 by a pressure rod 22. The control pressure chambers 27, 29 are separated from one another by a priority control piston 28 which is arranged so that it can be displaced axially in the valve chamber 24a and can likewise be rigidly supported relative to the regulating piston 21 by the control piston 23 and the pressure rod 22. If the control pressure line 14 carries the highest pressure, the control piston 23 is rigidly supported by the control piston 28 relative to the valve casing in the direction pointing away from the regulating piston 21. While the control pressure line 15 carries the highest pressure, the control piston 23 is rigidly supported relative to the regulating piston 21 and the control piston 28 is rigidly supported in the opposite direction relative to the valve casing. If the control pressure line 16 carries the highest pressure, the control piston 28 is rigidly supported by the control piston 23 relative to the regulating piston 21. In this way, the regulating piston 21 is always actuated by the control pressure of the pressure regulating valve 7 or 8 or 9 which is regulating to the highest working pressure pA.

The mode of operation of the embodiment of FIG. 2 is explained below using the example of a gear change from the "$2^{nd}$" gear to the "$3^{rd}$" gear.

In the "$2^{nd}$" gear, the working pressure pA of the working pressure line 13 acts on the control piston 28 via the derived control pressure pA16 of the control pressure line 16. Its piston force then acts, via the control piston 23 and the pressure rod 22 and, together with the valve spring 30, on the regulating piston 21 against the control pressure pV* derived from the supply pressure pV. During the gear change, the working pressure pA of the working pressure line 13 of the "$2^{nd}$" gear is increased by the pilot valve 38 and the connected pressure regulating valve 8, and the working pressure pA of the working pressure line 13 of the "$2^{nd}$" gear is reduced by the pilot valve 39. As soon as the working pressure pA of the working pressure line 12 exceeds the working pressure pA of the working pressure line 13, the control pistons 23 and 28 separate, so that the working pressure pA of the working pressure line 12 acts by the derived control pressure pA15 acting through the control piston 23 and the pressure rod 22, together with the valve spring 30, on the regulating piston 21 of the pressure regulating valve 10 for the supply pressure pV so as to determine the regulation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Gear-changing appliance of a gearbox having a frictional connection whose engagement makes an associated gearbox transmission ratio effective, comprising a hydraulic fluid actuator for actuating the frictional connection, and a pressure regulating valve configured to adjust a required working pressure of the hydraulic actuator and whose supply pressure is adjusted by an associated pressure regulating valve in accordance with a load-dependent control signal, wherein a control pressure derived from the working pressure is used for a load-dependent control signal, wherein the pressure regulating valve for the supply pressure (pV) is connected, via a priority control arrangement (17 or 18) operating as a pressure balance, to control pressure lines carrying a control pressure respectively, derived from relevant working pressure (pA) of at least two actuators for respectively actuating a frictional connection associated with a certain gearbox transmission ratio, and a regulating piston of the associated pressure regulating valve for the supply pressure and a priority control piston are arranged in tandem in and relative to a valve chamber and axially displaceable relative to one another, and enclose a first control pressure chamber therebetween, an end face, facing away from the regulating piston of the priority control piston closes off a second control pressure chamber in the valve chamber both control pressure chambers are respectively connected to a control pressure line operatively associated with frictional connections, and the priority control piston is rigidly supportable relative to the regulating piston in a direction pointing toward the regulating piston.

2. Gear-changing appliance according to claim 1, wherein the second control pressure chamber is separated off relative to a third control pressure chamber of the valve chamber by a second priority control piston arranged so as to be axially displaceable in the valve chamber which control pressure chamber is connected to a third control pressure line operatively associated with frictional connections, and the second priority control piston is rigidly supportable relative to the first priority control piston in a direction pointing toward the control piston.

3. Gear-changing appliance according to claim 1, wherein the pressure regulating valve for the supply pressure is influenced by sprung apparatus and by the control pressure derived from the respective working pressure (pA) so as to increase the supply pressure or by the control pressure (pV*) dependent on the supply pressure (pV) so as to reduce the supply pressure (pV).

4. Gear-changing appliance according to claim 3, wherein a control pressure surface (31) which acts on a regulating piston of the pressure regulating valve, for the control pressure (pV*) dependent on the supply pressure (pV), is larger than the control pressure surfaces which act on the same regulating piston, for the control pressure derived from the respective working pressures.

* * * * *